(12) United States Patent
Yamada et al.

(10) Patent No.: US 6,831,883 B1
(45) Date of Patent: Dec. 14, 2004

(54) METHOD OF AND APPARATUS FOR REPRODUCING AUDIO INFORMATION, PROGRAM STORAGE DEVICE AND COMPUTER DATA SIGNAL EMBODIED IN CARRIER WAVE

(75) Inventors: Youichi Yamada, Tokorozawa (JP); Hiroyuki Isobe, Tokorozawa (JP); Takashi Suzuki, Tokorozawa (JP); Koichiro Sakata, Tokorozawa (JP); Tomohiko Kimura, Tokorozawa (JP); Takeaki Funada, Tokorozawa (JP); Kazuo Kamei, Tokorozawa (JP); Gen Inoshita, Tokyo-to (JP); Kensuke Chiba, Tokyo-to (JP); Naomi Amemiya, Tokorozawa (JP); Hiroyasu Eguchi, Tokorozawa (JP); Keitaro Kaburagi, Tokorozawa (JP); Akiharu Yagi, Tokorozawa (JP); Toru Yada, Tokorozawa (JP); Yoshinori Kataoka, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 685 days.

(21) Appl. No.: 09/632,607

(22) Filed: Aug. 4, 2000

(30) Foreign Application Priority Data

Aug. 4, 1999 (JP) .......................... P11-221094

(51) Int. Cl.[7] ................................ G11B 7/00
(52) U.S. Cl. .................... 369/47.16; 369/53.34
(58) Field of Search .................... 369/30.23, 47.15, 369/47.16, 47.2, 47.23, 47.24, 47.32, 47.33, 47.34, 53.31, 53.34, 53.35, 53.36, 84.601, 84.603, 84.635, 84.636

(56) References Cited

U.S. PATENT DOCUMENTS

| 5,253,242 A | * | 10/1993 | Satoh et al. .............. 369/47.54 |
|---|---|---|---|
| 5,566,144 A | * | 10/1996 | Shinada ..................... 369/30.23 |
| 5,614,687 A | * | 3/1997 | Yamada et al. ............... 84/662 |
| 5,919,047 A | * | 7/1999 | Sone ......................... 360/72.2 |
| 6,301,365 B1 | | 10/2001 | Yamada et al. | 
| 6,630,621 B1 | * | 10/2003 | Yamada et al. ............... 84/603 |

FOREIGN PATENT DOCUMENTS

| EP | 791914 A | | 8/1987 | |
|---|---|---|---|---|
| GB | 2198574 A | * | 6/1988 | ........... G11B/27/10 |
| JP | 60-166892 | | 11/1985 | ........... G11B/27/02 |
| JP | 8-201542 | | 8/1996 | ........... G04F/10/00 |
| NL | 1000731 | | 1/1997 | |

OTHER PUBLICATIONS

Patent Abstracts of Japan 08201542 A, Aug. 8, 1996.

* cited by examiner

*Primary Examiner*—Thang V. Tran
*Assistant Examiner*—Bach Vuong
(74) *Attorney, Agent, or Firm*—Sughrue Mion, PLLC

(57) ABSTRACT

Both of one audio information and another audio information are recorded on a same information record medium. An audio information reproducing apparatus is provided with: a detecting device for detecting said one audio information and said another audio information from the information record medium and also detecting a time period required for one beat of the detected another audio information; and an accumulating device for accumulating said one audio information detected from the information record medium to thereby continue reproducing and outputting said one audio information through the accumulating device. The audio information reproducing apparatus is also provided with a controlling device for controlling the detecting device to detect said another audio information and the time period required for one beat, within a time duration that the accumulated one audio information is being reproduced and outputted through the accumulating device.

24 Claims, 7 Drawing Sheets

METHOD OF AND APPARATUS FOR REPRODUCING AUDIO INFORMATION, PROGRAM STORAGE DEVICE AND COMPUTER DATA SIGNAL EMBODIED IN CARRIER WAVE

BACKGROUND OF THE INVENTION

1. Field of the Invention

The present invention relates to a method of and an apparatus for reproducing audio information, and an information record medium on which an audio information reproduction program to enable such a reproduction is recorded and which can be read by a computer, and more particularly relates to a method of and an apparatus for reproducing the audio information, which can reproduce two or more audio information continuously without intermittence while maintaining a constant rhythm. The present invention also relates to a program storage device such as an information record medium for storing a program and a computer data signal embodied in a carrier wave, which enable a computer to perform such an audio information reproduction.

2. Description of the Related Art

A club or salon referred to as a so-called "club" in Japan is very popular in which young persons mainly enjoy a dance in time to a music composition having a nimble rhythm. In such a club, in order for the persons to enjoy the dance, it is preferred that a plurality of music compositions are continuously played while a constant rhythm is maintained, even between different music compositions.

Here, the "rhythm" implies such a structure that a strength and a weakness of a tone are periodically repeated in a certain music composition (namely, a beat).

A plurality of music compositions are outputted to the inside of the club as an editor for editing the combination of music compositions (hereafter, this editor is referred to as a "disc jockey") selects and synthesizes the music compositions respectively outputted from a plurality of reproducing apparatuses, in the actual spot or scene.

At this time, as an actual method of continuously reproducing and outputting two music compositions, the disc jockey drives two reproducing apparatuses, for example, by using the following procedure.

(i) While a first reproducing apparatus is used to reproduce and output one music composition from an information record medium such as an optical disc, a second reproducing apparatus is used to reproduce another music composition. Then, another music composition is listened to by the disc jockey by using a headphone or the like without outputting it into the inside of the club.

(ii) Then, a reproducing speed of the second reproducing apparatus is set such that, while another music composition is listened to by the disc jockey, the time period required for one beat in another music composition coincides with that in the one music composition (which is currently being reproduced and outputted). Then, a head portion of another music composition is searched (i.e., a so-called "head search" is performed).

(iii) When the one music composition which is currently being reproduced and outputted approaches an end thereof, a reproduction level of the one music composition is gradually dropped (a so-called "fade-out" is performed). Along with this, another music composition is reproduced from the head portion thereof while it is matched with the beat timing of the one music composition. Then, the reproduction level for another music composition is gradually increased (a so-called "fade-in" is performed), so that another music composition is outputted to the inside of the club.

(iv) When the reproduction level of another music composition becomes equal to a proper reproduction level, the reproduction of the one music composition, which has been reproduced and outputted, is stopped. Then, the first reproducing apparatus is ready for further another music composition to be continuously reproduced after another music composition which is currently being reproduced and outputted.

After that, as the disc jockey repeats the procedure (i) to the procedure (iv), the plurality of different music compositions can be reproduced continuously without the intermittence while the rhythm is maintained constant.

In the above-mentioned series of operations, the "beat" implies each portion of the strengths and weaknesses of the tones repeated in the cycles of the rhythms of each music composition, and it is composed of a strong beat and a weak beat. The "strong beat" implies a strong portion of the bar or beat in a flow of the rhythm (typically, this portion corresponds to a first beat on a staff, and this is a portion represented by a motion of a conductor in which a baton is brought down from the above). Moreover, the "weak beat" implies a weak portion of the bar or beat in the flow of the rhythm.

At this time, for example, a double time uses a strong beat and a weak beat. A triple time uses a strong beat, a weak beat and a weak beat. A quadruple time uses a strong beat, a weak beat, a middle beat and a weak beat.

On the other hand, as a method of mechanically carrying out such a continuous reproduction, there is a connection reproduction method using a memory, for example, as disclosed in Japanese Utility Model Application Laid Open Publication No. Sho. 60-166892.

However, in case that the continuous reproduction is performed by the above-mentioned manual operations of the disc jockey, it is required to temporarily stop the reproduction output of the music composition, which is being currently reproduced and outputted, and perform a detection of a time period required for one beat of the music composition to be next reproduced, in order to recognize this predetermined time duration to perform the continuous reproduction while keeping the consistency of the rhythm.

On the other hand, according to the above mentioned mechanical connection reproduction using the memory, there is only disclosed a technique of performing the continuous reproduction without inserting any vacant time duration between the plurality of music compositions, which are recorded on the same information record medium, and there is not disclosed any technique of detecting the time period required for one beat of the music composition, which is recorded on the same information record medium and is to be next reproduced.

SUMMARY OF THE INVENTION

The present invention is proposed in view of the above mentioned problems. It is therefore an object of the present invention to provide a method of and an apparatus for reproducing audio information, while continuing a reproduction output of one music composition, which can detect a time period required for one beat of another music composition, to thereby caution a disc jockey etc., by outputting the detected time period, or to thereby enable a reproduction control such as starting another music composition with making the time period required for one beat of said another music composition coincident with that of said one music composition, as well as a program storage device for storing a program such as an information record medium and a computer data signal embodied in a carrier wave, which enable a computer to function as such an audio information reproducing apparatus.

The above object of the present invention can be achieved by an apparatus for reproducing one audio information and another audio information, both of which are recorded on an information record medium. The apparatus is provided with: a detecting device such as a BPM (Beat Per Minute) detector etc., for detecting said one audio information and said another audio information from the information record medium and also detecting a time period required for one beat of the detected another audio information; an accumulating device such as a ring buffer memory etc., for accumulating said one audio information detected from the information record medium to thereby continue reproducing and outputting said one audio information through the accumulating device; and a controlling device such as a sub CPU (Central Processing Unit) etc., for controlling the detecting device to detect said another audio information and the time period required for one beat, within a time duration that the accumulated one audio information is being reproduced and outputted through the accumulating device.

According to the audio information reproducing apparatus of the present invention, the time period required for one beat of said another audio information is detected while said one audio information accumulated in the accumulating device is reproduced and outputted. Thus, it is possible, while continuing the reproduction of said one audio information recorded on the information record medium, to detect the time period required for one beat of said another audio information recorded on the same information record medium.

Therefore, it is possible to caution the disc jockey etc., by outputting the time period required for one beat of said another audio information while continuing the reproduction output of said one audio information, and it is also possible to perform the reproduction control such as starting the reproduction output of said another audio information while making the time period required for one beat of said another audio information coincident with that of said one audio information, so that said another audio information can be continuously reproduced and outputted after said one audio information from the same information record medium.

In one aspect of the apparatus of the present invention, the controlling device includes: a monitoring device such as a sub CPU etc., for monitoring an accumulation amount of said one audio information in the accumulating device while the detecting device is detecting the time period required for one beat; and a continuing device such as a sub CPU etc., for controlling the detecting device to transiently stop detecting the time period required for one beat and also controlling the detecting device and the accumulating device to continue reproducing and outputting said one audio information while detecting one portion of said one audio information, which has never been accumulated yet, from the information record medium and accumulating the detected one portion, in case that the monitored accumulation amount reaches a predetermined lower limit accumulation amount.

According to this aspect, when the accumulation amount is decreased to be the lower limit accumulation amount during the detection of the time period required for one beat, this detection is transiently stopped, and the reproduction and output of said one audio information is continued while the one portion is being accumulated. Thus, it is possible to detect the time period required for one beat of said another audio information while surely continuing the reproduction output of said one audio information.

In this aspect of the apparatus of the present invention, the monitoring device may also monitor the accumulation amount while the detecting device is detecting said one portion and the accumulating device is accumulating the detected one portion, after the detecting device transiently stops detecting the time period required for one beat. The controlling device may further include a resuming device for controlling the accumulating device to transiently stop accumulating the detected one portion and also controlling the detecting device to resume detecting the time period required for one beat, which has never been detected yet, in case that the monitored accumulation amount reaches a predetermined upper limit accumulation amount.

By constituting in this manner, when the accumulation amount is increased to be the upper limit accumulation amount, the accumulation of said one audio information is transiently stopped, and the detection of the time period required for one beat, which has been transiently stopped, is resumed. Thus, it is possible to detect the time period required for one beat of said another audio information while surely maintaining the condition of reproducing and outputting said one audio information.

The above object of the present invention can be also achieved by a method of reproducing one audio information and another audio information, both of which are recorded on an information record medium. The method is provided with: a detecting process of detecting said one audio information and said another audio information from the information record medium and also detecting a time period required for one beat of the detected another audio information; an accumulating process of accumulating said one audio information detected from the information record medium to thereby continue reproducing and outputting said one audio information through the accumulating process; and a controlling process of controlling the detecting process to detect said another audio information and the time period required for one beat, within a time duration that the accumulated one audio information is being reproduced and outputted through the accumulating process.

According to the audio information reproducing method of the present invention, the time period required for one beat of said another audio information is detected while said one audio information accumulated in the accumulating process is reproduced and outputted. Thus, it is possible, while continuing the reproduction of said one audio information recorded on the information record medium, to detect the time period required for one beat of said another audio information recorded on the same information record medium.

Therefore, it is possible to caution the disc jockey etc., by outputting the time period required for one beat of said another audio information while continuing the reproduction output of said one audio information, and it is also possible to perform the reproduction control such as starting the reproduction output of said another audio information while making the time period required for one beat of said another audio information coincident with that of said one audio information.

In one aspect of the method of the present invention, the controlling process includes: a monitoring process of monitoring an accumulation amount of said one audio information in the accumulating process while the detecting process is detecting the time period required for one beat; and a continuing process of controlling the detecting process to transiently stop detecting the time period required for one beat and also controlling the detecting process and the accumulating process to continue reproducing and outputting said one audio information while detecting one portion of said one audio information, which has never been accumulated yet, from the information record medium and accumulating the detected one portion, in case that the monitored accumulation amount reaches a predetermined lower limit accumulation amount.

According to this aspect, when the accumulation amount is decreased to be the lower limit accumulation amount during the detection of the time period required for one beat, this detection is transiently stopped, and the reproduction and output of said one audio information is continued while the one portion is being accumulated. Thus, it is possible to detect the time period required for one beat of said another audio information while surely continuing the reproduction output of said one audio information.

In this aspect of the method of the present invention, the monitoring process may also monitor the accumulation amount while the detecting process is detecting said one portion and the accumulating process is accumulating the detected one portion, after the detecting process transiently stops detecting the time period required for one beat. The controlling process may further include a resuming process of controlling the accumulating process to transiently stop accumulating the detected one portion and also controlling the detecting process to resume detecting the time period required for one beat, which has never been detected yet, in case that the monitored accumulation amount reaches a predetermined upper limit accumulation amount.

By constituting in this manner, when the accumulation amount is increased to be the upper limit accumulation amount, the accumulation of said one audio information is transiently stopped, and the detection of the time period required for one beat, which has been transiently stopped, is resumed. Thus, it is possible to detect the time period required for one beat of said another audio information while surely maintaining the condition of reproducing and outputting said one audio information.

The above object of the present invention can be also achieved by a program storage device readable by a computer, tangibly embodying a program of instructions executable by the computer to perform processes to reproduce one audio information and another audio information, both of which are recorded on an information record medium, in an audio information reproducing apparatus provided with: a detecting device for detecting said one audio information and said another audio information from the information record medium and also detecting a time period required for one beat of the detected another audio information; and an accumulating device for accumulating said one audio information. The processes include: a process of controlling the accumulating device to accumulate said one audio information detected from the information record medium to thereby continue reproducing and outputting said one audio information through the accumulating device, and a process of controlling the detecting device to detect said another audio information and the time period required for one beat, within a time duration that the accumulated one audio information is being reproduced and outputted through the accumulating device.

According to the program storage device of the present invention, as the computer reads in and executes the program stored therein, it is possible to realize the above described audio information reproducing apparatus of the present invention on the computer.

In one aspect of the program storage of the present invention, the processes may further include: a process of monitoring an accumulation amount of said one audio information in the accumulating device while the detecting device is detecting the time period required for one beat; and a process of controlling the detecting device to transiently stop detecting the time period required for one beat and also controlling the detecting device and the accumulating device to continue reproducing and outputting said one audio information while detecting one portion of said one audio information, which has never been accumulated yet, from the information record medium and accumulating the detected one portion, in case that the monitored accumulation amount reaches a predetermined lower limit accumulation amount.

In this aspect of the program storage device of the present invention, the processes may further include: a process of monitoring the accumulation amount while the detecting device is detecting said one portion and the accumulating device is accumulating the detected one portion, after the detecting device transiently stops detecting the time period required for one beat; and a process of controlling the accumulating device to transiently stop accumulating the detected one portion and also controlling the detecting device to resume detecting the time period required for one beat, which has never been detected yet, in case that the monitored accumulation amount reaches a predetermined upper limit accumulation amount.

The above object of the present invention can be also achieved by a computer data signal embodied in a carrier wave and representing a series of instructions which cause a computer to perform processes to reproduce one audio information and another audio information, both of which are recorded on an information record medium, in an audio information reproducing apparatus provided with: a detecting device for detecting said one audio information and said another audio information from the information record medium and also detecting a time period required for one beat of the detected another audio information; and an accumulating device for accumulating said one audio information. The processes include: a process of controlling the accumulating device to accumulate said one audio information detected from the information record medium to thereby continue reproducing and outputting said one audio information through the accumulating device, and a process of controlling the detecting device to detect said another audio information and the time period required for one beat, within a time duration that the accumulated one audio information is being reproduced and outputted through the accumulating device.

According to the computer data signal embodied in the carrier wave of the present invention, as the computer downloads and executes the program in the computer data signal, it is possible to realize the above described audio information reproducing apparatus of the present invention on the computer.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings. In the following embodiments, the present invention is applied to an audio information outputting apparatus, which is intended to play the music compositions in the above-mentioned club and which includes a mixer for superimposing the music compositions outputted by a plurality of audio players to thereby generate the music composition for playing.

Figure 1:
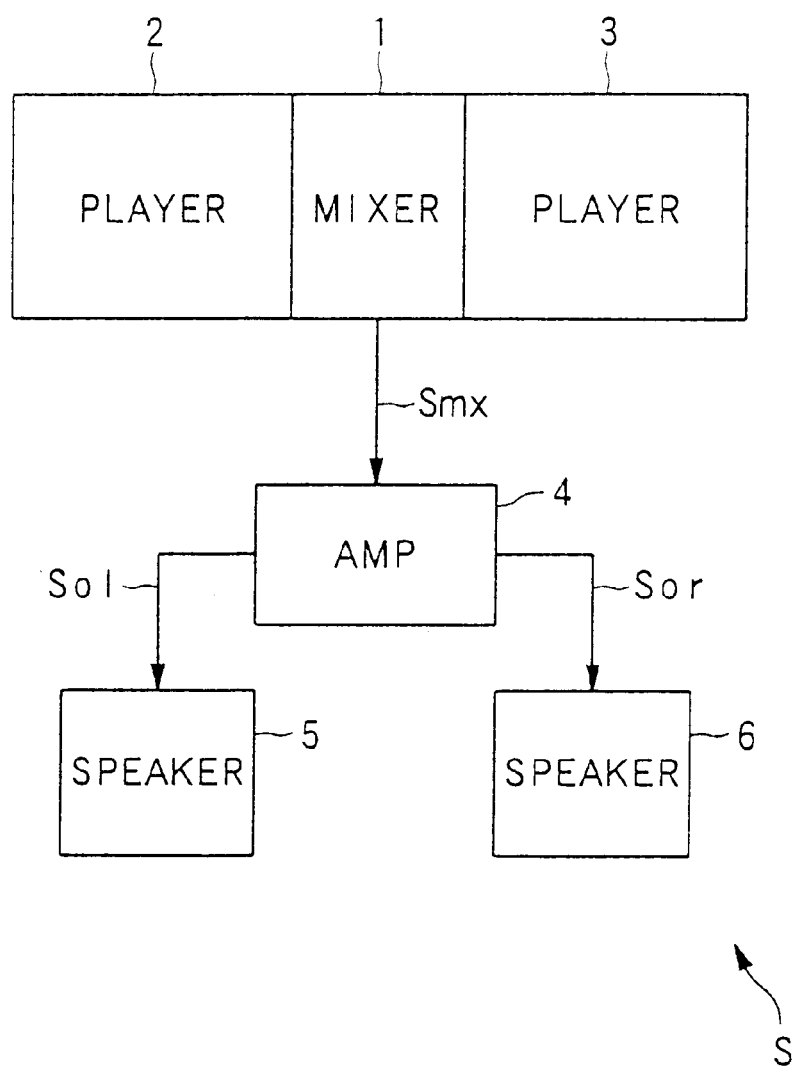
FIG. 1 is a block diagram showing a schematic configuration of an audio information outputting apparatus as an embodiment of the present invention.

At first, the whole configuration and operation for the audio information outputting apparatus according to the embodiment is described with reference to FIG. 1. FIG. 1 is a block diagram showing the schematic configuration of the audio information outputting apparatus as the embodiment.

In FIG. 1, an audio information outputting apparatus S is provided with a mixer 1, players 2 and 3, an amplifier 4, and speakers 5 and 6.

At this time, the players 2 and 3 may be analog players for respectively reproducing so-called analog records, or may be digital players for digitally reproducing information on a CD (Compact Discs), a DVD or the like.

Also, the mixer 1 and the players 2 and 3 are actually integrally mounted in an audio rack or the like.

Next, the schematic operations of the respective constitutional elements are explained.

At first, the players 2 and 3 respectively reproduce the analog records or the CDs etc., and respectively generate music composition signals including the plurality of music compositions, and then output them to the mixer 1.

Then, the mixer 1 synthesizes the respectively generated music composition signals in accordance with the operation for the disc jockey, generates a mixer signal Smx, and outputs it to the amplifier 4.

After that, the amplifier 4 amplifiers the respective music compositions included in the mixer signal Smx, generates a left signal Sol including audio information (including both of sound or tone information of an instrument or the like, and voice information of a human song or the like) to be included in a left channel and a right signal Sor including audio information to be included in a right channel, respectively, and outputs them to the speaker 5 for the left channel and the speaker 6 for the right channel, respectively.

By those operations, the speakers 5 and 6 output the audio information, respectively included in the left signal Sol and the right signal Sor corresponding to the speakers 5 and 6, as the sound or tone to the inside of the club.

Figure 2:
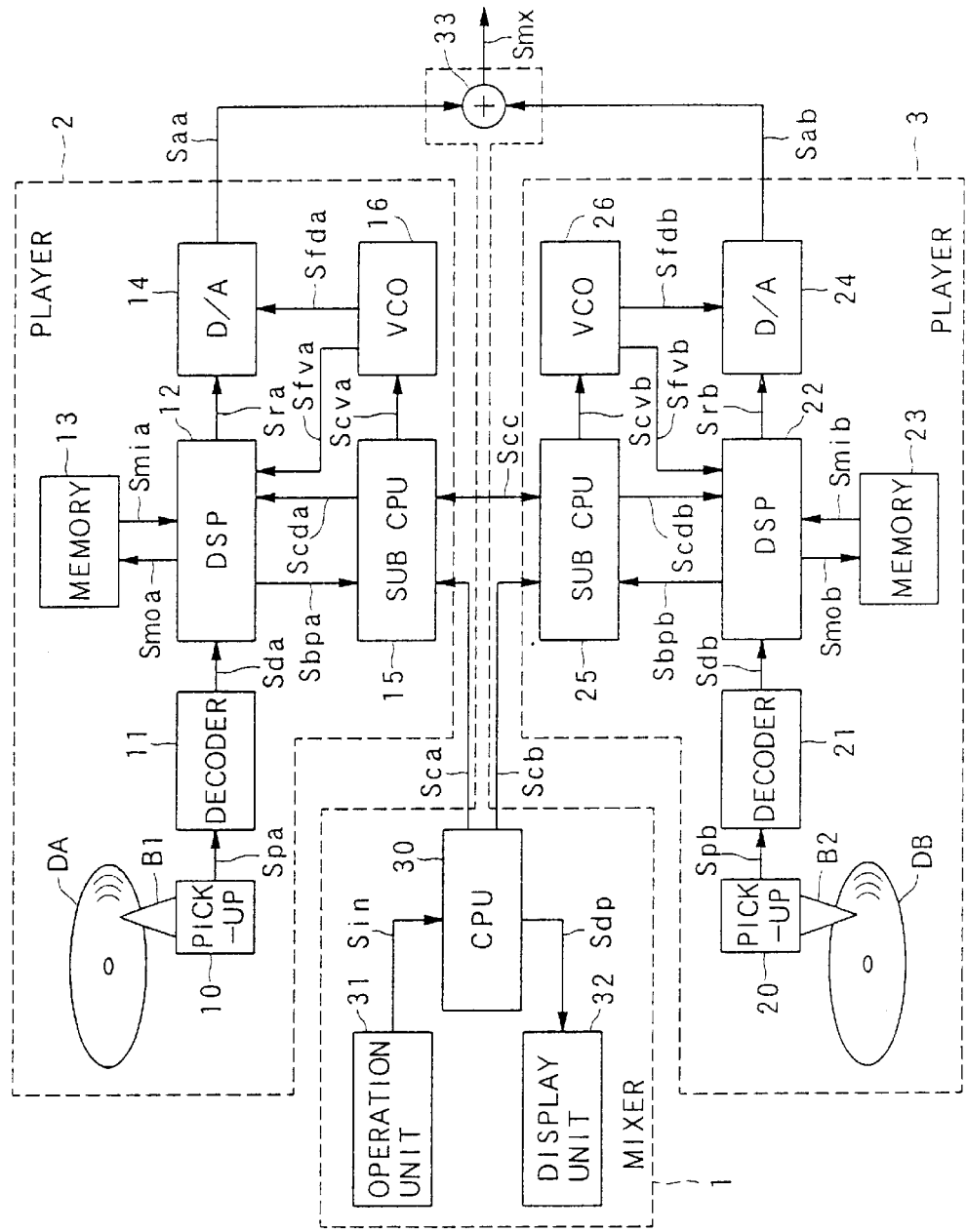
FIG. 2 is a block diagram showing detailed configurations of a mixer and respective players in the embodiment.

Next, the detailed configurations and operations of the mixer 1 and the players 2 and 3 according to the present embodiment are explained with reference to FIG. 2. FIG. 2 is a block diagram showing the detailed configurations of the mixer 1 and the players 2 and 3 in the embodiment.

At first, as shown in FIG. 2, the player 2 for reproducing an optical disc DA, which is a CD or the like and on which a music composition to be reproduced is recorded, is provided with: an optical pickup 10; a decoder 11; a DSP (Digital Signal Processor) 12; a memory 13; a D/A (Digital/Analog) converter 14; a sub CPU 15 serving as one example of a computer, a continuing device and a monitoring device; and a VCO (Voltage Controlled Oscillator) 16.

On the other hand, the player 3 for reproducing an optical disc DB, which is a CD or the like and on which a music composition to be reproduced is recorded, has the configuration similar to that of the player 2. Actually, the player 3 is provided with: an optical pickup 20; a decoder 21; a DSP 22; a memory 23; a D/A converter 24; a sub CPU 25 serving as one example of a computer, a continuing device and monitoring device; and a VCO 26.

The mixer 1 is provided with: a CPU 30 serving as one example of a computer; an operation unit 31; a display unit 32; and an adder 33.

Next, the operations of the respective constitutional elements will be described below. In the following description, the players 2 and 3 are operated under the substantially same conditions. So, the operations of the players 2 and 3 are commonly described.

In case that the player 2 or 3 reproduces a dance music composition from the optical disc DA or DB, the optical pickup 10 or 20 firstly drives a light source (not shown) including a semiconductor laser or the like to thereby emit a light beam B1 or B2. Then, the reception of the reflection light from the optical disc DA or DB enables the generation of a reproduction signal Spa or Spb that is an RF (Radio Frequency) signal corresponding to the music composition recorded on the optical disc DA or Db. The reproduction signal Spa or Spb is outputted to the decoder 11 or 21.

Accordingly, the decoder 11 or 21 applies a wave form re-shaping process, a decoding process, an amplifying process and the like onto the inputted reproduction signal Spa or Spb, to thereby digitize it and generate a digital decode signal Sda or Sdb. Then, the decoder 11 or 21 outputs the generated digital decode signal Sda or Sdb to the DSP 12 or 22.

Incidentally, the generation of the reproduction signal Spa or Spb in the optical pickup 10 or 20 and the generation of the digital decode signal Sda or Sdb in the decoder 11 or 21 are executed at a high speed, for example, such as a quadruple speed (e.g., 4 times speed) or the like. Thus, the generated digital decode signal Sda or Sdb is outputted to the DSP 12 or 22 at the quadruple speed or the like.

Then, the DSP 12 or 22 detects a later-described BPM (Beat Per Minutes) value of the music composition to be reproduced, which is included in the inputted digital decode signal Sda or Sdb, to thereby generate a BMP signal Sbpa or Sbpb indicative of the BMP value. Then, the DSP 12 or 22 outputs the generated BMP signal Sbpa or Sbpb to the sub CPU 15 or 25, and also applies later-described various processes onto the digital decode signal Sda or Sdb in accordance with a later-described control signal Scda or Scdb from the sub CPU 15 or 25 to thereby generate a music composition signal Sra or Srb, and output it to the D/A converter 14 or 24.

At this time, the DSP 12 or 22 carries out these processes while transiently storing the data necessary for these processes as a memory signal Smoa or Smob into the memory 13 or 23, and further reading out the stored data as a memory signal Smia or Smib from the memory 13 or 23. Here, one series of processes from the detection of the reproduction signal Spa or Spb of the optical disc DA or DB to the storage of the memory signal Smoa or Smob into the memory 13 or 23 are performed at a high speed such as a quadruple speed (i.e., four times speed). On the other hand, the processes after reading out of the memory signal Smia or Smib from the memory 13 or 23 are performed at a low speed or a normal speed (i.e., one time speed).

Then, the D/A converter 14 or 24 converts the processed music composition signal Sra or Srb into an analog signal to thereby generate an analog music composition signal Saa or Sab and output it to the adder 33.

At this time, the reading out speed at which the music composition signal Sra or Srb is read out from the DSP 12 or 22 and the digital/analog conversion frequency in the D/A converter 14 or 24 (i.e., the digital/analog conversion speed) are controlled in accordance with speed control signals Sfva and Sfda from the VCO 16 or speed control signals Sfvb and Sfdb from the VCO 26, respectively. Actually, even if the input speed of the digital decode signal Sda or Sdb to the DSP 12 or 22 is as high as the quadruple speed, each of the reading out speed from the DSP 12 or 22 and the digital/analog conversion speed in the D/A converter 14 or 24 is controlled to be a normal speed (i.e., one time speed).

Then, the adder 33 adds the analog music composition signals Saa and Sab to thereby generate the mixer signal Smx as the output of the mixer 1, and output it to the amplifier 4 in FIG. 1.

On the other hand, in the above-mentioned processes of the respective constitutional elements, the sub CPU 15 or 25 generates and outputs the control signal Scda or Scdb to the DSP 12 or 22 so as to execute the later-described operation for the continuous reproductions of the music compositions, depending upon the control signal Sca or Scb from the CPU 30 and the BMP signal Sbpa or Sbpb from the DSP 12 or 22 while sending and receiving a control signal Scc between each other.

In parallel with those operations, the sub CPU 15 or 25 generates a control signal Scva or Scvb to control the operation for the VCO 16 or 26, and outputs it to the VCO 16 or 26, respectively. Thus, the VCO 16 generates and outputs the speed control signals Sfva and Sfda, respectively to the DSP 12 and the D/A converter 14, so as to control the output speed of the music composition signal Sra from the DSP 12 and the digital/analog conversion frequency of the D/A converter 14 as mentioned above. The VCO 26 generates and outputs the speed control signals Sfvb and Sfdb, respectively to the DSP 22 and the D/A converter 24, so as to control the output speed of the music composition signal Srb from the DSP 22 and the digital/analog conversion frequency of the D/A converter 24 as mentioned above.

Moreover, the CPU 30 generates and outputs the control signal Sca or Scb to the sub CPU 15 or 25, so as to make the sub CPU 15 or 25 execute the above-mentioned reproduction control.

At this time, the operation for specifying the operation for the mixer 1 and the players 2 and 3 through the CPU 30 is executed by the operation unit 31. An operation signal Sin corresponding to this operation for specifying is outputted from the operation unit 31 to the CPU 30. Then, the CPU 30 carries out the above-mentioned controls based on the operation signal Sin.

Moreover, the information with regard to the operations of the mixer 1 and the players 2 and 3 controlled by the CPU 30 (actually, the detected respective BMP values and the like) is outputted from the CPU 30 as a display signal Sdp to the display unit 32, and is displayed on the display unit 32 for the disc jockey and the like.

Next, the detailed configurations and operations of the DSP 12 or 22 and the memory 13 or 23 will be described with reference to FIG. 3 together with their related constitutional elements. The DSP 12 and 22 have the configurations similar to each other and also carry out the operations similar to each other, while the memories 13 and 23 have the configurations similar to each other, and also carry out the operations similar to each other. Thus, the detailed configurations and operations of the DSP 12 and the memory 13 among them are respectively described in the following explanations.

Figure 3:
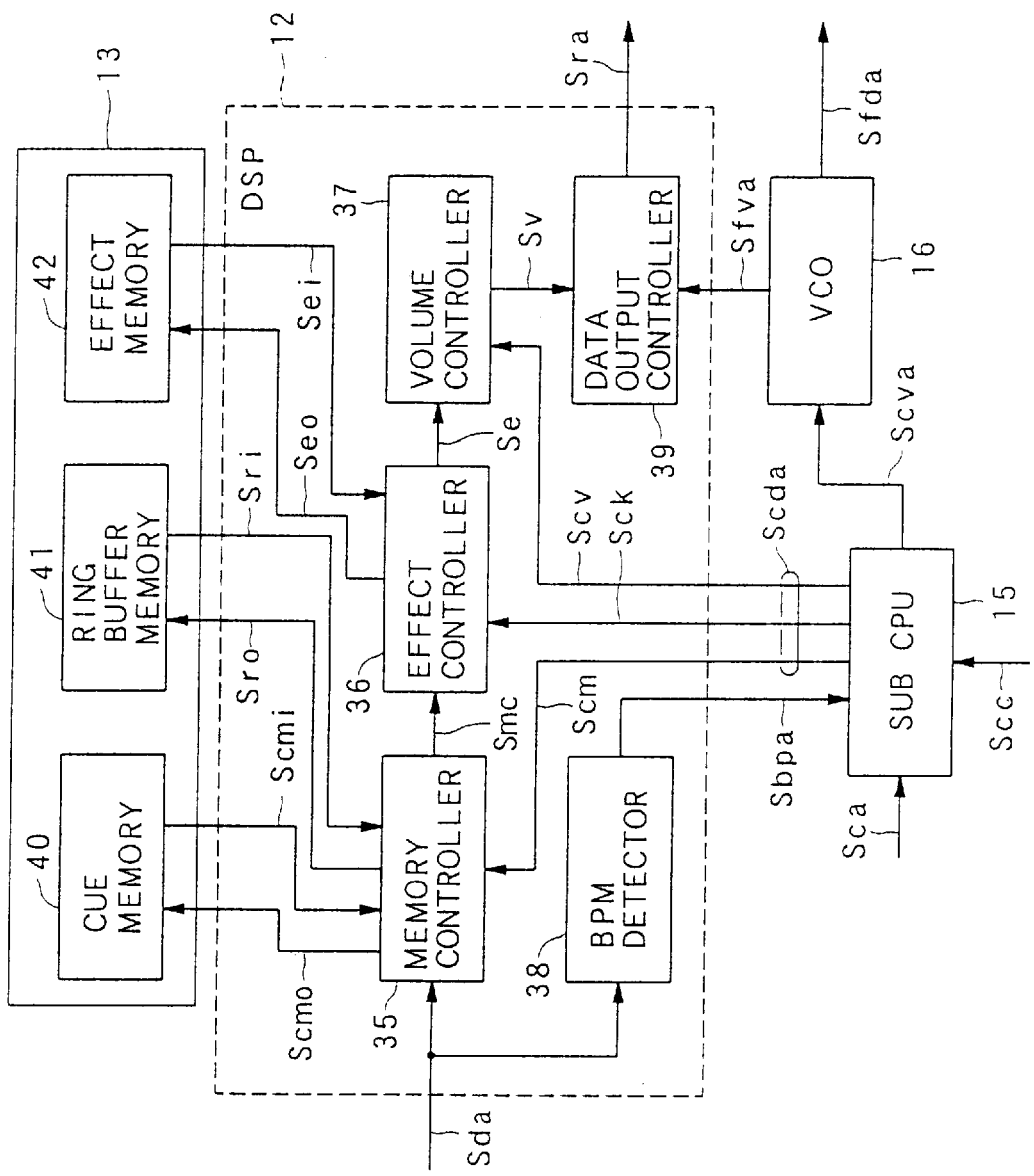
FIG. 3 is a block diagram showing a detailed configuration of each DSP in the embodiment.

As shown in FIG. 3, the DSP 12 is provided with: a memory controller 35; an effect controller 36; a volume controller 37; a BPM detector 38 serving as one example of a detecting device; and a data output controller 39. The DSP 12 is actually formed as one LSI (Large Scale Integrated circuit). These controllers are respectively defined as respective functions in the LSI chip.

Also, the memory 13 is provided with: a cue memory 40; a ring buffer memory 41 serving as one example as an accumulating device; and an effect memory 42. Here, each of the cue memory 40, the ring buffer memory 41 and the effect memory 42 is defined as a part of a memory area in the memory 13.

Next, the operations of the respective portions will be described.

At first, the BPM detector 38 detects the number of beats per minute of the music composition included in the inputted digital decode signal Sda (hereafter, the number of beats per minute is merely referred to as a "BPM value") to thereby generate the BPM signal Sbpa and output it to the sub CPU 15.

At this time, a process of detecting the BPM value in the BPM detector 38 is actually a process of continuing to detect an interval between the beats of the music composition for a certain time duration, and detecting the BPM value in accordance with the statistic of the beat intervals detected within the certain time duration. For example, such a process of automatically detecting the BPM value is performed by using a time counter as following. Namely, time-counting of the time counter is started at one time point when the level of a predetermined frequency component of the inputted audio signal exceeds a predetermined threshold level, and is stopped at another time point when the level of the frequency component exceed the threshold level again after a predetermined time duration has elapsed from the one time point. Then, the time-counted value is converted to the number of the beats for a predetermined unit time period to thereby obtain the BPM value. Such a process of automatically detecting the BPM value by using a time counter is known and is disclosed in a range between the paragraph numbers [0010] to [0027] and a range from FIG. 1 to FIG. 9 in Japanese Patent Application Laid Open Publication No. Hei. 8-201542, for example.

In other words, the process of detecting the BPM value is a process of detecting a beat timing, which is defined as a timing when a beat of each music composition (including both of the strong beat and the weak beat) is generated.

On the other hand, the cue memory 40 within the memory 13 is a memory for storing therein in advance the digital decode signal Sda corresponding to the head portion of a music composition to be next reproduced by the player 2, in order to compensate a transient interruption of the sound or tone due to the time required for optically reading out the data from the optical disc DA (occurring when a reproduction of a new music composition is started). Actually, for example, the digital decode signal Sda corresponding to two seconds at the head portion of the music composition to be next reproduced as the memory amount of the digital decode signal Sda is stored into the cue memory 40.

Next, the ring buffer memory 41 within the memory 13 is a memory for transiently storing therein the digital decode signal Sda corresponding to the music composition to be currently reproduced. Actually, the digital decode signal Sda is stored sequentially from the head thereof. Then, after all the memory areas within the ring buffer memory 41 are filled with the digital decode signals Sda, rewriting to replace the storage content by the digital decode signal Sda to be next stored from the head of the memory areas is repeated cyclically for the digital decode signal Sda corresponding to one music composition on the whole.

The effect memory 42 within the memory 13 is used to store therein the digital decode signal Sda, as the occasion demands, when the condition of the connection between the music compositions in the continuous reproduction of the music compositions is changed.

With respect to those memories, in accordance with a control signal Scm included in the control signal Scda outputted by the sub CPU 15, the memory controller 35 outputs and stored the inputted digital decode signal Sda into the cue memory 40 as a memory signal Scmo, as the occasion demands. Also, the memory controller 35 outputs and stores it into the ring buffer memory 41 as a memory signal Sro.

Moreover, the memory controller 35 reads out the digital decode signal Sda stored in the cue memory 40 or the ring buffer memory 41, as a memory signal Scmi or Sri, respectively as the occasion demands, and then outputs it as a reading out signal Smc to the effect controller 36.

Next, in accordance with a control signal Sck included in the control signal Scda outputted by the sub CPU 15, the effect controller 36 outputs and stores the inputted reading out signal Smc as a memory signal Seo into the effect memory 42, as the occasion demands. Also, while reading it out as a memory signal Sei fro the effect memory 42, the effect controller 36 applies a process required to change the above-mentioned connection condition between the music compositions (hereafter, referred to as a "connection pattern") onto the reading out signal Smc, to thereby generate an effect signal Se and output it to the volume controller 37.

Incidentally, the effect signal Se is generated only when the connection between the music compositions is to be done. Except for the timing to do such a connection, the inputted reading out signal Smc (in other words, the digital decode signal Sda) is outputted to the volume controller 37 as it is.

Each of the memory signals Scmo, Sro, and Seo corresponds to the memory signal Smoa in FIG. 2. Each of the memory signals Scmi, Sri and Sei corresponds to the memory signal Smia in FIG. 2.

Next, the volume controller 37 adjusts a level of the effect signal Se or the reading out signal Smc by using a conventional method in accordance with a control signal Scv included in the control signal Scda outputted from the sub CPU 15, to thereby generate a level adjusted signal Sv and output it to the data output controller 39.

Then, the data output controller 39 controls an output rate (in other words, the BPM value (or tempo) of the music composition included in the music composition signal Sra) when the inputted level adjusted signal Sv is outputted as the music composition signal Sra as described later, in accordance with the speed control signal Sfva from the VCO 16, to thereby generate the music composition signal Sra at the controlled output rate and output it to the D/A converter 14 in FIG. 2. At this time, actually, the data output controller 39 controls the frequency of a clock signal for controlling the output rate of the music composition signal Sra, to a value indicated by the speed control signal Sfva, so as to control the output rate of the music composition signal Sra.

Figure 4:
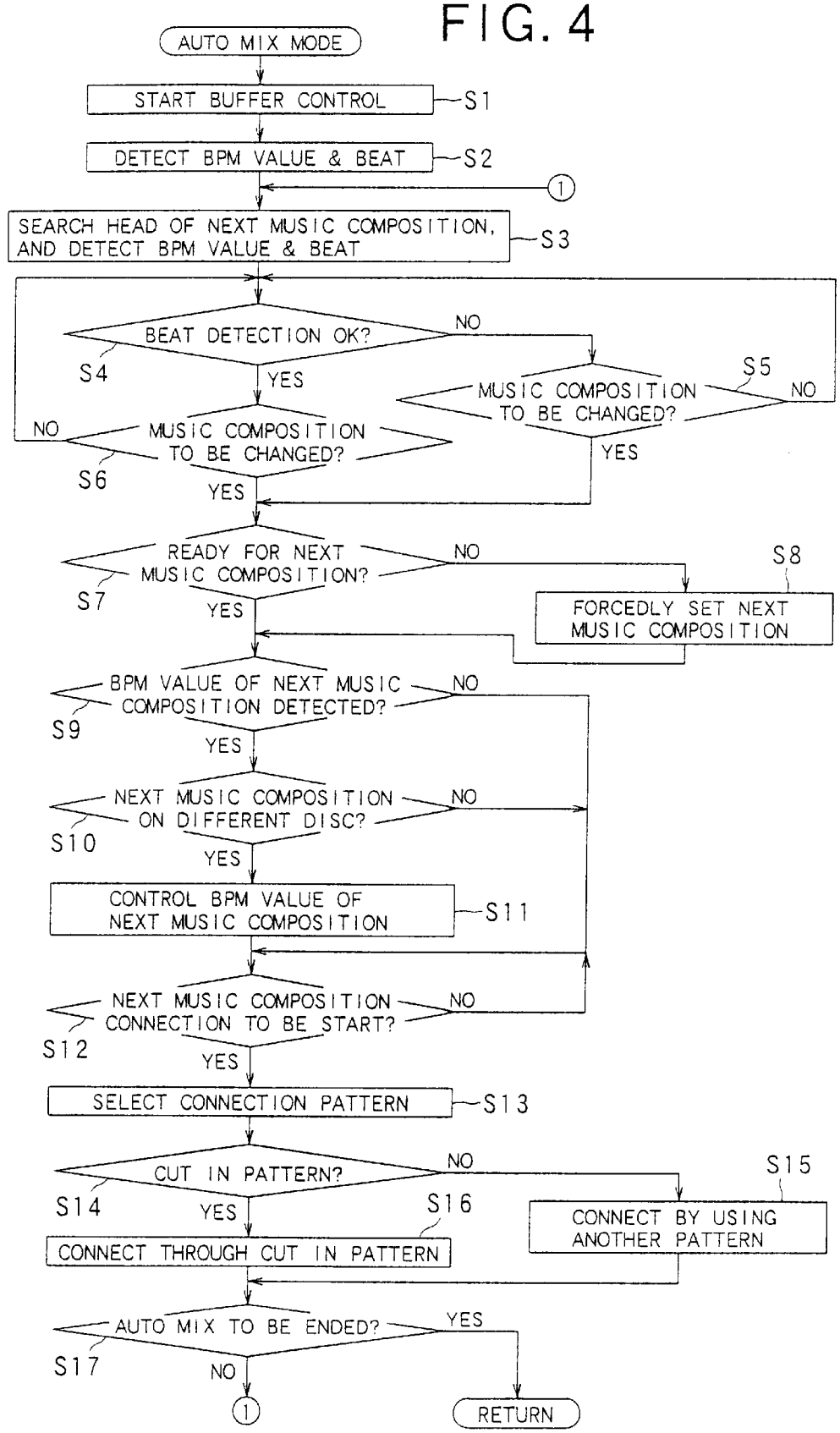
FIG. 4 is a flowchart showing a reproduction controlling process in the embodiment.
Figure 5A:
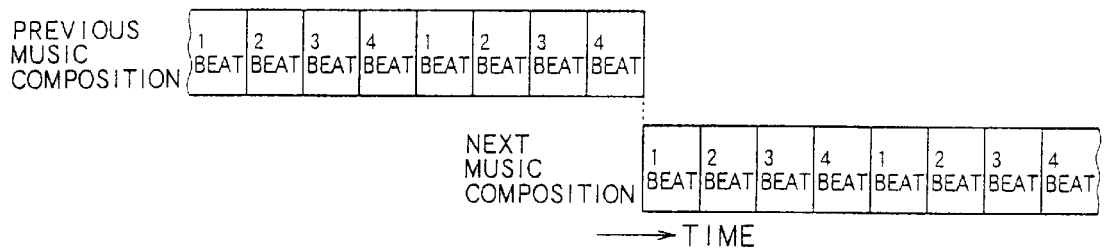
FIG. 5A is a diagram showing a connection pattern between music compositions as well as respective beats thereof in the embodiment.

Next, the process of controlling the continuous reproduction of the music compositions according to the embodiment executed by the above-mentioned respective constitutional elements will be described with reference to FIGS. 4, 5A and 5B. FIG. 4 is a flowchart showing the reproduction control process, and FIGS. 5A and 5B are diagrams showing the connection pattern between the music compositions.

Figure 5B:
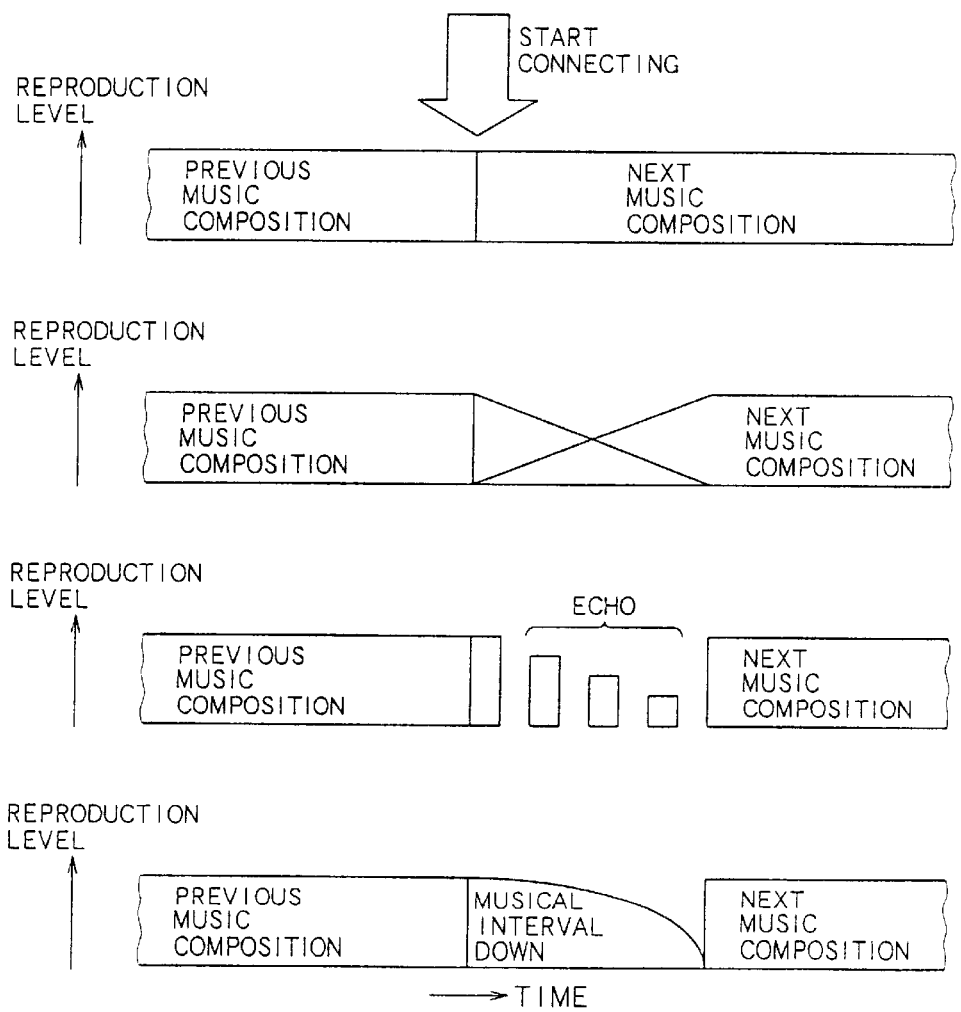
FIG. 5B is a diagram showing various connection patterns between the music compositions in the embodiment.

The longitudinal length of each stage in FIG. 5B denotes a reproduction level of each music composition.

Moreover, in the process of controlling the continuous reproduction shown in FIG. 4, it is assumed that the specification of the music compositions to be continuously reproduced and the specification of the order of the music compositions are executed in advance by the operation unit 31 and that the contents of these specifications are recognized by the CPU 30 and the sub CPU 15 or 25.

Furthermore, it is assumed that the process of controlling the continuous reproduction shown in FIG. 4 is performed by the CPU 30 and the sub CPU 15 or 25 in cooperation with each other.

As shown in FIG. 4, in the process of controlling the continuous reproduction between the music compositions in the present embodiment, when a mode of continuously reproducing a plurality of music compositions automatically (hereinafter, this mode is referred to as an "auto mix mode") is specified through the operation unit 31, the memory controller 35 starts the processes of generating the digital decode signal Sda corresponding to the head portion of a music composition to be firstly reproduced, and storing it into the cue memory 40. Also the memory controller 35 starts the process of storing the digital decode signals Sda corresponding to the portions after the head portion into the ring buffer memory 41 in the reproduction order. Moreover, the memory controller 35 generates the music composition signal Sra or Srb, and continues to output the corresponding music composition (Step S1).

Next, the BPM value in the music composition currently being reproduced and outputted is detected, and the beat timing of the music composition is also detected (Step S2).

The processes of detecting the beat timing and the BPM value at the step S2 are done by using the memory 13 or 23 etc., within the player, which is currently reproducing the music composition.

Next, the head portion of the music composition, which is to be reproduced continuously after the music composition currently being reproduced and outputted, is searched (i.e., a so-called "head search" is performed) on the optical disc DA or DB (hereafter, this music composition being searched is referred to as a "next music composition"). The detections of the beat timing and the BPM value of the next music composition are respectively performed (Step S3).

The processes of carrying out the head search of the next music composition and detecting the BPM value at the step S3 are done by using the memory 13 or 23 etc., within the player, which is currently reproducing the music composition, if the next music composition is recorded on the optical disc DA or DB, on which the music composition currently being reproduced and outputted is recorded. On the contrary, if the next music composition is recorded on the optical disc DB or DA different from the optical disc DA or DB, on which the music composition currently being reproduced and outputted is recorded, the processes at the step S3 are done by using the memory 23 or 13 etc., within the player different from the player, which is currently reproducing the music composition.

Next, it is judged whether or not the beat timing of the music composition that is currently reproduced and outputted has been actually detected at the step S2 (Step S4). If the beat timing has never been detected (Step S4: NO), it is further judged whether or not the timing when the next music composition is to be outputted has just come (Step S5).

The judgment at the step S5 is done in accordance with whether or not a predetermined time duration has elapsed from the start of the output of the music composition currently being reproduced and outputted, in the normal process of controlling the continuous reproduction. On the other hand, for example, if a continuous reproduction for only initial one minute in each music composition is set in advance, the judgment at the step S5 is done in accordance with whether or not one minute has elapsed from the start of the output of the music composition currently being reproduced and outputted.

Then, if the timing of reproducing and outputting the next music composition has never come in the judgment at the step S5 (Step S5: NO), the operational flow returns back to the step S4, so that it is checked whether or not the beat timing has been detected while continuing to reproduce the current music composition. On the other hand, if the timing of reproducing and outputting the next music composition has just come (Step S5: YES), the operational flow proceeds to a step S7 as it is.

On the other hand, if the beat timing in the music composition currently being reproduced and outputted is normally detected in the judgment at the step S4 (Step S4: YES), it is judged whether or not the timing of reproducing and outputting the next music composition has come, in accordance with a count value of the detected beat timing, similarly to the step S5 (Step S6).

In the judgment at the step S6, it is judged whether or not a predetermined number of beats has been counted from the start of the output of the music composition currently being reproduced and outputted, in accordance with the count value of the detected beat timing, in the normal process of controlling the continuous reproduction. On the other hand, if the continuous reproduction for only initial one minute in each music composition is set in advance, it is judged whether or not the amount corresponding to, for example, 128 beats (which is a length corresponding to approximately one minute in a case that a length of one beat is 0.5 second for a dance music composition of a quadruple time) has been counted from the start of the output of the music composition currently being reproduced and outputted.

If the timing of reproducing and outputting the next music composition has never come yet in the judgment at the step S6 (Step S6: NO), the operational flow returns back to the step S4, and continues to reproduce the current music composition. On the other hand, if the timing of reproducing and outputting the next music composition has just come (Step S6: YES), it is next judged whether or not a preparation to start reproducing the next music composition is completed (actually, whether or not the digital decode signal Sda corresponding to the head portion of the next music composition is stored in the cue memory 40) (Step S7).

Then, if the preparation is completed (Step S7: YES), it is next judged whether or not the BPM value of the next music composition has been actually detected at the step S3 (Step S9). If it is not detected (Step S9: NO), the operational flow proceeds to a step S12 in order to start reproducing the next music composition without considering the connectivity of rhythm. On the other hand, if the BPM value of the next music composition has been actually detected (Step S9: YES), it is next judged whether or not the music composition, which is to be reproduced as the next music composition, is recorded on the optical disc DA or DB different from that on which the music composition currently reproduced and outputted is recorded (Step S10).

In the judgment at the step S10, if the next music composition is not recorded on the optical disc DA or DB different from that on which the music composition currently being reproduced and outputted is recorded i.e., recorded on the same optical disc DA or DB (Step S10: NO), the operational flow proceeds to the step S12 in order to start reproducing the next music composition. On the other hand, if the next music composition is recorded on the optical disc DA or DB different from that on which the music composition currently being reproduced and outputted is recorded (Step S10; YES), the BPM value of the next music composition recorded on the different optical disc DB or DA is set so as to coincide with the BPM value of the music composition currently being reproduced and outputted (Step S11). The process at the step S11 is executed by the data output controller 39 within the player which is to reproduce the next music composition.

When the setting of the BPM value of the next music composition is ended, it is next judged whether or not the beat timing when the reproduction of the next music composition is to be started has come (Step S12).

In this step S12, if the beat timing of the music composition currently being reproduced and outputted has been detected, it is judged so as to start the reproduction output of the next music composition immediately after the elapse of the time corresponding to one beat from the start of the final beat (for example, a 128-th beat) of the music composition currently reproduced and outputted (e.g., start it at the timing of the 129-th beat) (refer to FIG. 5A). In this case, the digital decode signal Sda is read out and outputted at a corresponding timing from the cue memory 40 which stores the head portion of the next music composition.

Also at the step S12, if the beat timing of the music composition currently being reproduced and outputted has never been detected, it is judged so as to start reproducing the next music composition by reading out the content of the cue memory 40 corresponding to the next music composition, immediately after the end of the current music composition.

In the judgment at the step S12, if the beat timing when the reproduction of the next music composition is to be started has never come yet (Step S12: NO), the operational flow waits for the beat timing. On the other hand, if the beat timing has just come (Step S12: YES), the connection pattern is selected in accordance with a predetermined procedure in case that the next music composition is to be actually connected to the music composition currently being reproduced and outputted (Step S13).

At this time, at the step S13, one connection pattern is selected from, for example, four kinds of connection patterns as shown in FIG. 5B.

The respective connection patterns shown in FIG. 5B are explained here. At first, a connection pattern shown on a top stage of FIG. 5B is referred to as a so-called "cut in pattern", which is a connection pattern to start the reproduction output of the next music composition simultaneously with an end of a previous music composition (i.e., the music composition currently being reproduced and outputted). In this cut in pattern, the reproduction start of the next music composition is controlled so as to start the beat of the next music composition (refer to FIG. 5A) in time to match the beat timing of the previous music composition as described later (refer to the step S12).

A connection pattern shown on a second stage from the top stage of FIG. 5B is referred to as a so-called "cross fade pattern", in which the connection is done as follows. That is, a fade-out is performed on the previous music composition for a predetermined period, and it is ended. Then, a fade-in for the next music composition is started from a timing when the fade-out is started. The fade-in for the next music composition is completed at a timing when the fade-out for the previous music composition is ended. Thus, the reproduction level is kept at a natural level.

A connection pattern shown on a second stage from a bottom stage of FIG. 5B is referred to as a so-called "echo pattern", in which the connection is doe as follows. That is, when the reproduction output of the previous music composition is ended, a portion of a music composition corresponding to a final beat in the previous music composition is repeated in time to match the beat timing of the previous music composition, and the reproduction level is gradually dropped to then carry out the reproduction. Then, the reproduction of the next music composition is started when the reproduction level in the repetition decreases to a zero level. In this echo pattern, the rhythms at the time of the connection can be continuously connected by starting the reproduction of the next music composition so as to coincide with the beat timing of the previous music composition.

Incidentally, if the music compositions are connected through the echo pattern, the previous music composition is ended while the portion of the music composition corresponding to the final beat of the previous music composition is repeatedly reproduced and outputted by the operations of the effect controller 36 and the effect memory 42.

Finally, a connection pattern shown on the bottom stage of FIG. 5B is referred to as a so-called "zip pattern", in which the connection pattern is done as follows. That is, when the reproduction output of the previous music composition is ended, a musical interval or distance of the previous music composition is gradually made down, and the reproduction level of the previous music composition is finally dropped to the zero level. Then, the reproduction of the next music composition is started in time to match the beat timing of the previous music composition from the timing of the zero level. In this zip pattern, when the previous music composition is ended, such a change on the acoustic feeling that a rotation of a so-called analog record is gradually stopped can be obtained.

In addition, in case that the music compositions are connected through the zip pattern, the musical interval or distance (a so-called "key" of a music composition) is gradually made down by the operations of the effect controller 36 and the effect memory 42, and the previous music composition is ended.

In FIG. 4 again, when the connection pattern is selected at the step S13, it is next judged whether or not the selected connection pattern is the cut in pattern (Step S14).

Then, if it is not the cut in pattern (Step S14: NO), the connection to the next music composition is done through another connection pattern (Step S15), and the operational flow proceeds to a step S17.

On the other hand, in the judgment at the step S14, if the selected connection pattern is the cut in pattern (Step S14: YES), the music composition is ended at the final beat timing of the music composition currently being reproduced and outputted. At the same time, the reproduction output of the next music composition is started from the beginning of the beat timing of the next music composition (Step S16). In this case, if the next music composition is recorded on the optical disc DA or DB same as that on which the previous music composition is recorded, the reproduction of the next music composition is started after the BPM value of the next music composition is set so as to coincide with the BPM value of the previous music composition at the timing of the reproduction output.

When the reproduction of the next music composition is started, it is judged whether or not an operation indicative of the end of the auto mix mode shown in FIG. 4 is executed through the operation unit 31 (Step S17). If it is executed (Step S17: YES), the process of controlling the continuous reproduction is ended as it is. On the other hand, if it is not executed and the operation based on the auto mix mode is to be continued (Step S17: NO), the operational flow returns back to the step S3, and the above-mentioned operations are performed on the next music composition whose reproduction is started.

If the preparation for the next music composition is not completed at the step S7 (Step S7: NO), the next music composition is forcedly set (Step S8), and the operational flow proceeds to the step S9.

At this time, as the forcedly setting method at the step S8, for example, when the continuous reproduction is being done by using music compositions within one optical disc DA or DB and also the next music composition is being selected in accordance with a predetermined order, the digital decode signal Sda corresponding to the head portion of the next music composition based on the record order within the optical disc DA or DB is accumulated in the cue memory 40, and it remains on standby.

When the continuous reproduction is being done by alternately using two optical discs DA and DB and also the next music composition is being selected in accordance with the predetermined order or one of the optical discs DA and DB is being exchanged, the digital decode signal Sda corresponding to the head portion of the next music composition based on the record order within the optical disc DA or DB that is currently placed on any of the players 2 or 3 is accumulated in the cue memory 40, and it remains on standby.

Moreover, when the continuous reproduction is being done by using two optical discs DA and DB in a predetermined order (which is a random order and is not the record order) and also the next music composition is not set, the operational flow returns back to the first music composition in the predetermined order. Then, the digital decode signal Sda corresponding to the head portion of the first music composition is accumulated in the cue memory 40, and it remains on standby.

Figure 6:
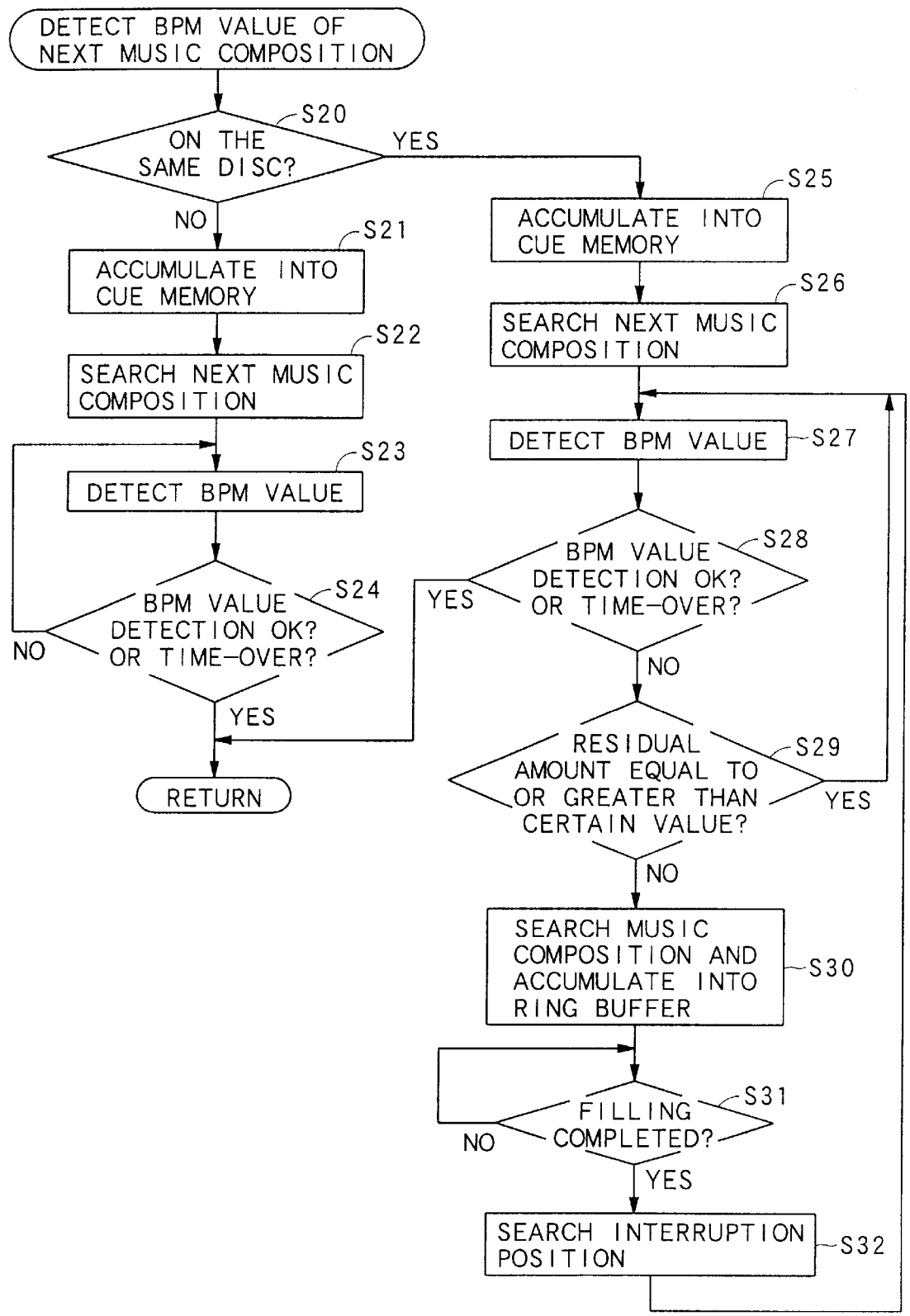
FIG. 6 is a flowchart showing a detailed portion of a process of detecting a BPM value of a next music composition in the embodiment.
Figure 7A:
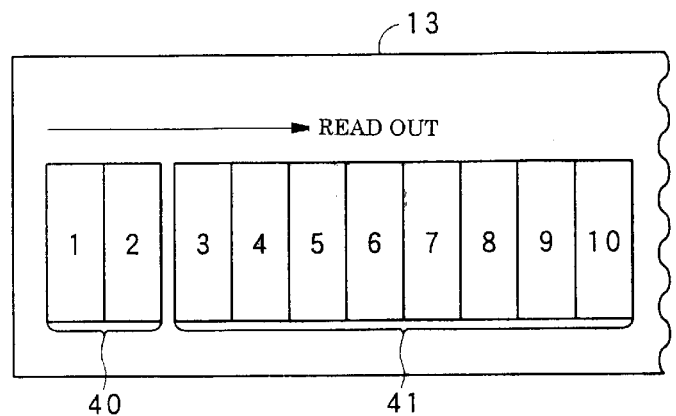
FIG. 7A is a diagram showing one state of a cue memory and a ring buffer memory during their usage in the embodiment.
Figure 7B:
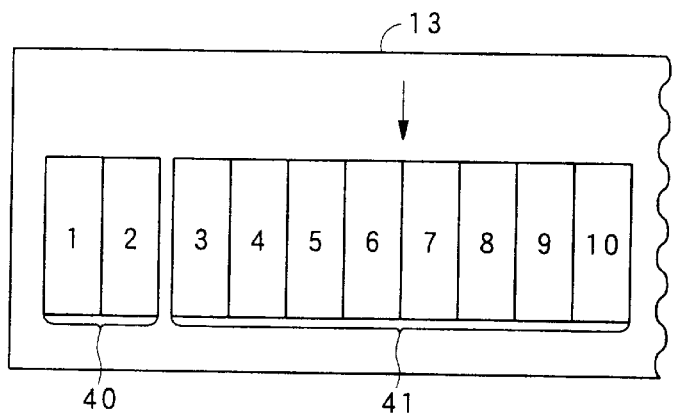
FIG. 7B is a diagram showing another state of the cue memory and the ring buffer memory during their usage in the embodiment.
Figure 7C:
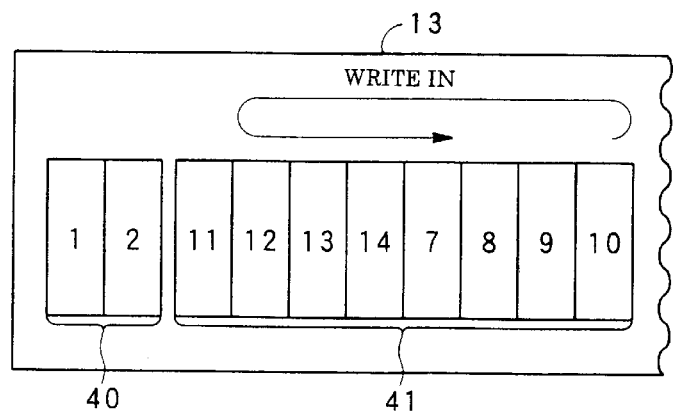
FIG. 7C is a diagram showing another state of the cue memory and the ring buffer memory during their usage in the embodiment.

Next, the detailed portion of a process of detecting the BPM value of the next music composition at the step S3 according to the present invention will be described with reference to FIG. 6 and FIG. 7A to FIG. 7C. FIG. 6 is a flowchart showing the detailed portion of the process of detecting the BPM value of the next music composition, and FIG. 7A to FIG. 7C are diagrams showing the respective usage condition of the cue memory 40 and the ring buffer memory 41.

In the following explanation, it is assumed that the music composition is being currently reproduced and outputted from the optical disc DA.

In FIG. 6, in the process of detecting the BPM value of the next music composition at the step S3, it is firstly checked whether a music composition whose reproduction is specified as the next music composition is recorded on the optical disc DA or on the optical disc DB (Step S20).

If the next music composition is the music composition recorded on the optical disc DB (Step S20: NO), the next music composition is detected from the optical disc DB in the player 3, and its head portion is stored into the cue memory 40 in the memory 23 (Step S21).

Next, portions of the next music composition after the head portion stored in the cue memory 40 are sequentially stored into the ring buffer memory 41, by searching the head portion of the next music composition again (Step S22). The BPM value of the next music composition being stored in the ring buffer memory 41 is detected by using the BPM detector 38 in the DSP 23, and is then stored into a memory (not shown) in the sub CPU 25 (Step S23).

Then, it is judged whether the BPM value is certainly detected at the step S23 or the BPM value cannot be detected and a predetermined time period has elapsed (a so-called "time-over" occurs) (Step S24). If the BPM value cannot be detected and the time-over does not occur (Step S24: NO), the operational flow returns to the step S23 so as to continue the process of detecting the BPM value as it is (Step S23). On the other hand, if the BPM value can be detected or the time-over occurs (Step S24: YES), the operational flow proceeds to the step S4 in FIG. 4.

When the operations at the steps S21 to S24 are executed in the player 3, the utilization of the ring buffer memory 41 in the later-described memory 13 enables the continuation of the detection and the reproduction output of the music composition from the optical disc DA, in the player 2.

On the other hand, in the judgment at the step S20, if the next music composition is the music composition recorded on the optical disc DA (Step S20: YES), the data of the music composition, which is accumulated in the ring buffer memory 41 of the memory 13 and is being currently reproduced, is used to move (scan) the optical pickup 10 while continuing to reproduce the music composition, to thereby search the next music composition. Accordingly, the head portion of the next music composition is detected from the optical disc DA, and is stored into the cue memory 40 of the memory 13 (Step S25).

Next, the head portion of the next music composition is again searched on the optical disc DA by the optical pickup 10 (Step S26). The BPM value of the stored next music composition is detected by using the BPM detector 38 in the DSP 13, and is stored into a memory (not shown) in the sub CPU 15 (Step S27).

Then, it is judged whether or not the BPM value is detected at the step S27 or the time-over occurs (Step S28). If the BPM value can be detected or the time-over occurs (Step S28: YES), the operational flow proceeds to the step S4 s it is. On the other hand, if the BPM value cannot be detected and the time-over does not occur (Step S28: NO), it is next judged whether or not a residual accumulation amount of the ring buffer memory 41 in the memory 13 (i.e., a residual accumulation amount of the music composition currently being reproduced and outputted) becomes a certain minimum accumulation amount set in advance (Step S29).

In the judgment at the step S29, if it is not reduced to the minimum accumulation amount and the residual accumulation amount is equal to or greater than the minimum accumulation amount (Step S29: YES), the operational flow returns back to the step S27. Then, while the operation for detecting the BPM value is repeated, the music composition which is currently being reproduced and outputted continues to be reproduced and outputted. On the other hand, if the residual accumulation amount is exhausted to the minimum accumulation amount (Step S29: NO), the further continuation of the detection of the BPM value causes the interruption of the reproduction output of the music composition from the player 2. So, in order to protect this interruption, the detection of the BPM value (refer to the step S27) is transiently stopped. Moreover, the detection from the optical disc DA is resumed for the original music composition which is currently being reproduced and outputted, so that non-reproduced portions of the music composition which is currently being reproduced and outputted is used to fill in the ring buffer memory 41 (Step S30).

Here, the minimum accumulation amount functioning as a standard in the judgment at the step S29 is defined as an accumulation amount, which enables the continuation of the reproduction output of the music composition until the resumption of the data accumulation after the completion of a movement of the optical pickup 10, even if the data accumulation into the ring buffer memory 41 is transiently stopped in order to move the optical pickup 10 to any position on the optical disc DA, for example.

Next, it is judged whether or not the filling into the ring buffer memory 41 is competed (Step S31). If the filling is not completed (Step S31: NO), the filling into the non-reproduced portion is continued (Step S30). On the other hand, if the filling is completed (Step S31: YES), the detection position on the optical disc DA at which the operation for detecting the BPM value is interrupted at the step S30 is searched by using the optical pickup 10 (Step S32), and the operation for detecting the BPM value is resumed (Step S27).

Next, the usage condition of the ring buffer memory 41 in the memory 13 in the above-mentioned series of operations will be described below with reference to FIG. 7A to FIG. 7C.

At first, the typical usage condition of the ring buffer memory 41 is described (namely, when the operation for detecting the BPM value of the next music composition is not carried out).

At the beginning of the reproduction of the music composition currently being reproduced, the data of the music composition detected from the optical disc DA are sequentially filled from the cue memory 40 in the memory 13, and this process is continued also in the ring buffer memory 41.

Then, a reading out operation at a first round is started from the cue memory 40 when the ring buffer memory 41 is filled (refer to FIG. 7A).

After that, when the accumulation amount of not-outputted data in the ring buffer memory 41 reaches a predetermined minimum accumulation amount (e.g., half of a maximum accumulation amount in a case of FIG. 7B), the data of the music composition which has never been accumulated in the ring buffer memory 41 is read out from the optical disc DA. Then, the read out data is stored while replacing the initial data from a lead of the ring buffer memory 41 (refer to FIG. 7C).

The operation is repeated sequentially and cyclically, so that the reproduction output of the music composition can be continued by using the ring buffer memory 41.

When the search of the next music composition (the next music composition on the same optical disc DA) is instructed during the reproduction of the music composition (refer to the step S3), the head portion of the next music composition is firstly accumulated into the cue memory 40 (refer to the step S25) to further search the head portion of the next music composition (refer to the step S26) and then detect the BPM value of the next music composition (refer to the step S27).

Then, if the current reproduction output of the music composition causes the accumulation amount of the not-outputted data in the ring buffer memory 41 in the memory 13 to reach the minimum accumulation amount (refer to Step S29: NO), the detection of the BPM value of the next music composition is transiently stopped, and the not-accumulated portion of the music composition which is currently being reproduced and outputted is accumulated into the ring buffer memory 41, so as to fill up the ring buffer memory 41 (refer to the step S30). Thus, the reproduction output of the music composition can be continued without intermittence.

As mentioned above, according to the process of detecting the BPM value of the next music composition in the embodiment, one music composition is accumulated in the ring buffer memory 41. Then, the BPM value of another music composition to be continuously reproduced and outputted is detected during the reproduction output of the one accumulated music composition. Thus, while the reproduction of the one music composition is continued, it is possible to detect the BPM value of another music composition recorded on the same optical disc DA or DB.

Therefore, it is possible to caution the disc jockey etc., by outputting the BPM value of another music composition while the reproduction output of one music composition is continued, or it is possible to perform a reproduction control such as starting the reproduction of another music composition while making the BPM values of one music composition and another music composition coincident with each other.

Also, if the accumulation amount in the ring buffer memory 41 reaches the minimum accumulation amount during the detection of the BPM value of another music composition, the detection of the BPM value is transiently stopped. Then, while accumulating not-accumulated portions of one music composition, it continues the reproduction output of the one music composition. Therefore, it is possible to detect the BPM value of another music composition while surely continuing the reproduction output of the one music composition.

Moreover, when one portion of one music composition is accumulated up to the upper limit of the accumulation amount, the accumulation of the one music composition is transiently stopped, and the detection of the BPM value of another music composition, which is stopped until that time, is resumed for the portion of another music composition where the BPM value has never detected yet. Therefore, it is possible to surely detect the BPM value of another music composition while maintaining the state of the reproduction output of the one music composition.

Furthermore, since each music composition is a music composition for dance and the BPM value of another music composition is detected during the reproduction output of one music composition, it is possible to continue the dance while surely maintaining the rhythm feeling between the two music compositions and also maintaining the state of the continuous reproduction between the music compositions.

In the example shown in FIG. 6, the process is described for detecting the BPM value of the next music composition when the music composition is being reproduced from the optical disc DA. Otherwise, in a case that the operational flow proceeds to the step S3 during the reproduction of the music composition from the optical disc DB, by exchanging the memory 13 and the memory 23 in the above-described configuration, it is also possible to perform the detection of the BPM value of the next music composition in parallel with the reproduction output in the same manner.

Also, in the embodiment, the case is described in which the strong beat of the next music composition follows the weak beat of the previous music composition when the connection is done in the continuous reproduction (refer to FIG. 5A (in the case of the quadruple beat)). Otherwise, the connection of a weak beat or a middle strong beat of the next music composition to a weak beat of the previous music composition also enables the connection between the music compositions.

Furthermore, it may be configured such that a program corresponding to the flow charts shown in FIGS. 4 and 6 is stored in a flexible disc serving as one example of an information record medium etc., and then it is read out and executed by the CPU 30 and the sub CPU 15 or 25. Alternatively, such a computer program may be downloaded to the audio information outputting apparatus S through a network such as an internet.

Moreover, in the embodiment, the case is described in which the present invention is applied to the audio information outputting apparatus S including the two players 2 and 3. Otherwise, the present invention can be applied to the case in which an audio information outputting apparatus including three or more players reproduces and outputs a music composition, after a music composition that is reproduced and outputted from one player, in parallel from the other two or more players.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-221094 filed on Aug. 4, 1999 including the specification, claims, drawings and summary is incorporated herein by reference in its entirety.

What is claimed is:

1. An apparatus for reproducing one audio information and another audio information, both of which are recorded on an information record medium, said apparatus comprising:

a detecting device for detecting said one audio information and said another audio information from said information record medium and also detecting a time period required for one beat of said detected another audio information;

an accumulating device for accumulating said one audio information detected from said information record medium to thereby continue reproducing and outputting said one audio information through said accumulating device; and a controlling device for controlling said detecting device to detect said another audio information and the time period required for one beat, within a time duration that said accumulated one audio information is being reproduced and outputted through said accumulating device.

2. An apparatus according to claim 1 for reproducing one audio information and another audio information, both of which are recorded on an information record medium, said apparatus comprising:

a detecting device for detecting said one audio information and said another audio information from said information record medium and also detecting a time period required for one beat of said detected another audio information;

an accumulating device for accumulating said one audio information detected from said information record medium to thereby continue reproducing and outputting said one audio information through said accumulating device; and a controlling device for controlling said detecting device to detect said another audio information and the time period required for one beat, within a time duration that said accumulated one audio information is being reproduced and outputted through said accumulating device, wherein said controlling device comprises:

a monitoring device for monitoring an accumulation amount of said one audio information in said accumulating device while said detecting device is detecting the time period required for one beat; and a continuing device for controlling said detecting device to transiently stop detecting the time period required for one beat and also controlling said detecting device and said accumulating device to continue reproducing and outputting said one audio information while detecting one portion of said one audio information, which has never been accumulated yet, from said information record medium and accumulating said detected one portion, in case that said monitored accumulation amount reaches a predetermined lower limit accumulation amount.

3. An apparatus according to claim 2, wherein said monitoring device also monitors the accumulation mount while said detecting device is detecting said one portion and said accumulating device is accumulating said detected one portion, after said detecting device transiently stops detecting the time period required for one beat; and said controlling device further comprises a resuming device for controlling said accumulating device to transiently stop accumulating said detected one portion and also controlling said detecting device to resume detecting the time period required for one beat, which has never been detected yet, in case that said monitored accumulation amount reaches a predetermined upper limit accumulation amount.

4. A method of reproducing one audio information and another audio information, both of which are recorded on an information record medium, said method comprising:

a detecting process of detecting said one audio information and said another audio information from said information record medium and also detecting a time period required for one beat of said detected another audio information;

an accumulating process of accumulating said one audio information detected from said information record medium to thereby continue reproducing and outputting said information through said accumulating process; and a controlling process of controlling said detecting process to detect said another audio information and the time period required for one beat, within a time duration that said accumulated one audio information is being reproduced and outputted through said accumulating process.

5. A method of reproducing one audio information and another audio information, both of which are recorded on an information record medium, said method comprising:

a detecting process of detecting said one audio information and said another audio information from said information record medium and also detecting a time period required for one beat of said detected another audio information;

an accumulating process of accumulating said one audio information detected from said information record medium to thereby continue reproducing and outputting said information through said accumulating process; and a controlling process of controlling said detecting process to detect said another audio information and the time period required for one beat, within a time duration that said accumulated one audio information is being reproduced and outputted through said accumulating process, wherein said controlling process comprises:

a monitoring process of monitoring an accumulation amount of said one audio information in said accumulating process while said detecting process is detecting the time period required for one beat; and a continuing process of controlling said detecting process to transiently stop detecting the time period required for one beat and also controlling said detecting process and said accumulating process to continue reproducing and outputting said one audio information while detecting one portion of said one audio information, which has never been accumulated yet, from said information record medium and accumulating said detected one portion, in case that said monitored accumulation amount reaches a predetermined lower limit accumulation amount.

6. A method according to claim 5, wherein said monitoring process also monitors the accumulation amount while said detecting process is detecting said one portion and said accumulating process is accumulating said detected one portion, after said detecting process transiently stops detecting the line period required for one beat; and said controlling process further comprises a resuming process of controlling said accumulating process to transiently stop accumulating said detected one portion and also controlling said detecting process to resume detecting the time period required for one beat, which has never been detected yet, in case that said monitored accumulation amount reaches a predetermined upper limit accumulation amount.

7. A program storage device readable by a computer, tangibly embodying a program of instructions executable by the computer to perform processes to reproduce one audio information and another audio information, both of which are recorded on an information record medium, in an audio information reproducing apparatus comprising: a detecting device for detecting said one audio information and said another audio information from said information record medium and also detecting a time period required for one beat of said detected another audio information; and an accumulating device for accumulating said one audio information, said processes comprising:

a process of controlling said accumulating device to accumulate said one audio information detected from said information record medium to thereby continue reproducing and outputting said one audio information through said accumulating device. and a process of controlling said detecting device to detect said another audio information and the time period required for one beat, within a time duration that said accumulated one audio information is being reproduced and outputted through said accumulating device.

8. A program storage device readable by a computer, tangibly embodying a program of instructions executable by the computer to perform processes to reproduce one audio information and another audio information, both of which are recorded on an information record medium, in an audio information reproducing apparatus comprising: a detecting device for detecting said one audio information and said another audio information from said information record medium and also detecting a time period required for one beat of said detected another audio information; and an accumulating device for accumulating said one audio information, said processes comprising:

a process of controlling said accumulating device to accumulate said one audio information detected from said information record medium to thereby continue reproducing and outputting said one audio information through said accumulating device. and a process of controlling said detecting device to detect said another audio information and the time period required for one beat, within a time duration that said accumulated one audio information is being reproduced and outputted through said accumulating device, wherein said processes further comprise:

a process of monitoring an accumulation amount of said one audio information in said accumulating device while said detecting device is detecting the time period required for one beat; and a process of controlling said detecting device to transiently stop detecting the time period required for one beat and also controlling said detecting device and said accumulating device to continue reproducing and outputting said one audio information, while detecting one portion of said one audio information, which has never been accumulated yet, from said information record medium and accumulating said detected one portion, in case that said monitored accumulation amount reaches a predetermined lower limit accumulation amount.

9. A program storage device according to claim 8, wherein said processes further comprise:

a process of monitoring the accumulation amount while said detecting device is detecting said one portion and said accumulating detecting device transiently stops detecting the time period required for one beat; and a process of controlling said accumulating device to transiently stop accumulating said detected one portion and also controlling said detecting device to resume detecting the time period required for one beat, which has never been detected yet, in case that said monitored accumulation amount reaches a predetermined upper limit accumulation amount.

10. A computer data signal embodied in a carrier wave and, representing a series of instructions which cause a computer to perform processes to reproduce one audio information and another audio information, both of which are recorded on an information record medium, in an audio information reproducing apparatus comprising: a detecting device for detecting said one audio information and said another audio information from said information record medium and also detecting a time period required for one beat of said detected another audio information; and an accumulating device for accumulating said one audio information, said processes comprising:

a process of controlling said accumulating device to accumulate said one audio information detected from said information record medium to thereby continue reproducing and outputting said one audio information through said accumulating device, and a process of controlling said detecting device to detect said another audio information and the time period required for one beat, within a time duration that said accumulated one audio information being reproduced and outputted through said accumulating device.

11. A computer data signal embodied in a carrier wave and, representing a series of instructions which cause a computer to perform processes to reproduce one audio information and another audio information, both of which are recorded on an information record medium, in an audio information reproducing apparatus comprising: a detecting device for detecting said one audio information and said another audio information from said information record medium and also detecting a time period required for one beat of said detected another audio information;

and an accumulating device for accumulating said one audio information, said processes comprising:

a process of controlling said accumulating device to accumulate said one audio information detected from said information record medium to thereby continue reproducing and outputting said one audio information through said accumulating device, and a process of controlling said detecting device to detect said another audio information and the time period required for one beat, within a time duration that said accumulated one audio information being reproduced and outputted through said accumulating device, wherein said processes further comprise:

a process of monitoring an accumulation amount of said one audio information in said accumulating device while said detecting device is detecting the time period required for one beat; and a process of controlling said detecting device to transiently stop detecting the time period required for one beat and also controlling said detecting device and said accumulating device to continue reproducing and outputting said one audio information while detecting one portion of said one audio information, which has never been accumulated yet, from said information record medium and accumulating said detected one portion, in case that said monitored accumulation amount reaches a predetermined lower limit accumulation amount.

12. A computer data signal according to claim 11, wherein said processes further comprise:

a process of monitoring the accumulation amount while said detecting device is detecting said one portion and said accumulating device is accumulating said detected one portion, after said detecting device transiently stops detecting the time period required for one beat; and a process of controlling said accumulating device to transiently stop accumulating said detected one portion and also controlling said detecting device to resume detecting the time period required for one beat, which has never been detected yet, in case that said monitored accumulation amount reaches a predetermined upper limit accumulation amount.

13. An apparatus for reproducing one audio information and another audio information, said apparatus comprising:

a detecting device which detects said one audio information and said another audio information, and detects a time period required for one beat of said detected another audio information;

an accumulating device which accumulates said one audio information to thereby continue reproducing and outputting said one audio information through said accumulating device; and a controlling device for controlling said detecting device to detect said another audio information and the time period required for one beat, within a time duration that said accumulated one audio information is being reproduced and outputted through said accumulating device.

14. An apparatus according to claim 13, wherein said controlling device comprises:

a monitoring device which monitors an accumulation amount of said one audio information in said accumulating device; and a continuing device which controls said detecting device to transiently stop detecting the time period required for one beat in case that said monitored accumulation amount reaches a predetermined lower limit accumulation amount, said detecting device and said accumulating device continue reproducing and outputting said one audio information while detecting one portion of said one audio information which has not been accumulated and accumulating said one portion.

15. An apparatus according to claim 14, wherein said monitoring device monitors the accumulation mount while said detecting device is detecting said one portion and said accumulating device is accumulating said detected one portion, after said detecting device transiently stops detecting the time period required for one beat; and said controlling device further comprises a resuming device which controls said accumulating device to transiently stop accumulating said detected one portion, and controls said detecting device to resume detecting the time period required for one beat which has not been detected, in case that said monitored accumulation amount reaches a predetermined upper limit accumulation amount.

16. A method of reproducing one audio information and another audio information said method comprising:

detecting said one audio information;

detecting said another audio information;

detecting a time period required for one beat of said detected another audio information;

accumulating said detected one audio information; and outputting said accumulated one audio information, wherein said detecting said another audio information and said detecting the time period required for said one beat are within a time duration of said outputting of said accumulated one audio information.

17. A method according to claim 16, further comprising:

monitoring an accumulation amount of said accumulated one audio information while detecting the time period required for one beat; and transiently stopping said detecting the time period required for one beat and continue outputting said accumulated one audio information, while detecting one portion of said one audio information which has not been accumulated and accumulating said detected one portion, in case that said monitored accumulation amount reaches a predetermined lower limit accumulation amount.

18. A method according to claim 17, wherein said monitoring comprises monitoring the accumulation amount, while said detecting said one portion and said accumulating said detected one portion, after said transiently stopping detecting the line period required for one beat, said method further comprising:

transiently stopping said accumulating said detected one portion and resuming detecting the time period required for one beat, which has not detected, in case that said monitored accumulation amount reaches a predetermined upper limit accumulation amount.

19. A program storage device readable by a computer, tangibly embodying a program of instructions executable by the computer to perform processes to reproduce one audio information and another audio information in an audio information reproducing apparatus comprising: a detecting device for detecting said one audio information and said another audio information and detecting a time period required for one beat of said detected another audio information; and an accumulating device for accumulating said one audio information, said processes comprising:

a process of controlling said accumulating device to accumulate said one audio information to thereby continue reproducing and outputting said one audio information through said accumulating device. and a process of controlling said detecting device to detect said another audio information and the time period required for one beat, within a time duration that said accumulated one audio information is being reproduced and outputted through said accumulating device.

20. A program storage device according to claim 19, wherein said processes further comprise:

a process of monitoring an accumulation amount of said one audio information in said accumulating device while said detecting device is detecting the time period required for one beat; and a process of controlling said detecting device to transiently stop detecting the time period required for one beat and controlling said detecting device and said accumulating device to continue reproducing and outputting said one audio information, while detecting one portion of said one audio information, which has not been accumulated, and accumulating said detected one portion, in case that said monitored accumulation amount reaches a predetermined lower limit accumulation amount.

21. A program storage device according to claim 20, wherein said processes further comprise:

a process of monitoring the accumulation amount while said detecting device is detecting said one portion and said accumulating detecting device transiently stops detecting the time period required for one beat; and a process of controlling said accumulating device to transiently stop accumulating said detected one portion and controlling said detecting device to resume detecting the time period required for one beat, which has not been detect, in case that said monitored accumulation amount reaches a predetermined upper limit accumulation amount.

22. A computer data signal embodied in a carrier wave and, representing a series of instructions which cause a computer to perform processes to reproduce one audio information and another audio information in an audio information reproducing apparatus comprising: a detecting device for detecting said one audio information and said another audio information and detecting a time period required for one beat of said detected another audio information; and an accumulating device for accumulating said one audio information, said processes comprising:

a process of controlling said accumulating device to accumulate said one audio information to thereby continue reproducing and outputting said one audio information through said accumulating device. and a process of controlling said detecting device to detect said another audio information and the time period required for one beat, within a time duration that said accumulated one audio information is being reproduced and outputted through said accumulating device.

23. A computer data signal according to claim 22, wherein said processes further comprise:

a process of monitoring an accumulation amount of said one audio information in said accumulating device while said detecting device is detecting the time period required for one beat; and a process of controlling said detecting device to transiently stop detecting the time period required for one beat and controlling said detecting device and said accumulating device to continue reproducing and outputting said one audio information, while detecting one portion of said one audio information, which has not been accumulated, and accumulating said detected one portion, in case that said monitored accumulation amount reaches a predetermined lower limit accumulation amount.

24. A computer data signal according to claim 23, wherein said processes further comprise:

a process of monitoring the accumulation amount while said detecting device is detecting said one portion and said accumulating detecting device transiently stops detecting the time period required for one beat; and a process of controlling said accumulating device to transiently stop accumulating said detected one portion and controlling said detecting device to resume detecting the time period required for one beat, which has not been detect, in case that said monitored accumulation amount reaches a predetermined upper limit accumulation amount.

* * * * *

UNITED STATES PATENT AND TRADEMARK OFFICE
CERTIFICATE OF CORRECTION

PATENT NO. : 6,831,883 B1
DATED : December 14, 2004
INVENTOR(S) : Youichi Yamada et al.

Page 1 of 1

It is certified that error appears in the above-identified patent and that said Letters Patent is hereby corrected as shown below:

Column 21,
Line 52, please delete "mount" and insert -- amount --;

Column 23,
Lines 15 and 37, please delete "." and insert -- ; --;

Column 25,
Line 43, please delete "mount" and insert -- amount --;

Column 26,
Line 39, please delete "." and insert -- ; --;

Column 27,
Line 21, please delete "." and insert -- ; --.

Signed and Sealed this

Fifteenth Day of March, 2005

JON W. DUDAS
*Director of the United States Patent and Trademark Office*